(12) United States Patent
Ancuta et al.

(10) Patent No.: US 10,844,749 B2
(45) Date of Patent: Nov. 24, 2020

(54) AIRCRAFT PROPULSION ASSEMBLY PROVIDED WITH STEPS ALLOWING AN OPERATOR TO REACH THE TOP OF SAME

(71) Applicant: SAFRAN AIRCRAFT ENGINES, Paris (FR)

(72) Inventors: Carmen Gina Ancuta, Paris (FR); Bruna Manuela Ramos, Seine Port (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 163 days.

(21) Appl. No.: 15/780,941

(22) PCT Filed: Dec. 5, 2016

(86) PCT No.: PCT/FR2016/053203
§ 371 (c)(1),
(2) Date: Jun. 1, 2018

(87) PCT Pub. No.: WO2017/098122
PCT Pub. Date: Jun. 15, 2017

(65) Prior Publication Data
US 2018/0283216 A1 Oct. 4, 2018

(30) Foreign Application Priority Data

Dec. 8, 2015 (FR) .................................... 15 61969

(51) Int. Cl.
*F02K 1/72* (2006.01)
*F01D 25/28* (2006.01)
(Continued)

(52) U.S. Cl.
CPC .............. *F01D 25/285* (2013.01); *B64C 7/00* (2013.01); *B64D 29/02* (2013.01); *B64F 5/60* (2017.01); *F02K 1/72* (2013.01); *F05D 2230/80* (2013.01)

(58) Field of Classification Search
CPC ..... F02K 1/64; F02K 1/70; F02K 1/72; F02K 1/763; F01D 25/285; B64C 7/00; B64D 29/02; F05D 2230/80
See application file for complete search history.

(56) References Cited

U.S. PATENT DOCUMENTS 5,507,143 A * 4/1996 Luttgeharm ............ F02K 1/563
239/265.31
2006/0011779 A1 1/2006 Cazals et al.
(Continued)

FOREIGN PATENT DOCUMENTS

CA 2 510 673 A1 1/2006
FR 2 914 700 A1 10/2008

OTHER PUBLICATIONS

International Search Report dated Mar. 1, 2017 in PCT/FR2016/053203 filed Dec. 5, 2016.
(Continued)

*Primary Examiner* — William H Rodriguez
(74) *Attorney, Agent, or Firm* — Oblon, McClelland, Maier & Neustadt, L.L.P.

(57) ABSTRACT

An aircraft propulsion assembly having a thrust reverser with moving guards, including an engine covered by a front cover and a rear cover that are both mobile; moving guards supported by the rear cover, the guards being covered by the front cover in normal operation, and extending into a space separating the front cover from the rear cover when the rear cover is moved to the rear; two arcuate frames, which are spaced apart and surround the engine in order to support actuators for moving the rear cover; the space located
(Continued)

between the two arcuate frames being uncovered when the front and rear covers are moved to the front and rear; and wherein the two arcuate frames jointly support a series of elements forming steps which constitute a ladder for quick access to the top of the propulsion assembly.

9 Claims, 4 Drawing Sheets

(51) Int. Cl.
*B64F 5/60* (2017.01)
*B64D 29/02* (2006.01)
*B64C 7/00* (2006.01)

(56) References Cited

U.S. PATENT DOCUMENTS

2008/0067287 A1   3/2008   Guibert et al.

| | | | |
|---|---|---|---|
| 2010/0005777 A1* | 1/2010 | Marshall | F02K 1/09 |
| | | | 60/204 |
| 2010/0040466 A1* | 2/2010 | Vauchel | B64D 27/18 |
| | | | 415/213.1 |
| 2010/0107599 A1* | 5/2010 | Vauchel | B64D 29/08 |
| | | | 60/226.2 |
| 2010/0270428 A1* | 10/2010 | Murphy | F02K 1/72 |
| | | | 244/110 B |
| 2010/0327110 A1 | 12/2010 | Caruel et al. | |
| 2011/0146230 A1 | 6/2011 | Lachapelle et al. | |
| 2015/0308376 A1* | 10/2015 | James | F02K 1/72 |
| | | | 239/265.19 |
| 2016/0025039 A1* | 1/2016 | Boileau | F02K 1/09 |
| | | | 239/265.19 |

OTHER PUBLICATIONS

Preliminary French Search Report dated Aug. 15, 2016 in French Application 1561969 filed Dec. 8, 2015.

* cited by examiner

US 10,844,749 B2

AIRCRAFT PROPULSION ASSEMBLY PROVIDED WITH STEPS ALLOWING AN OPERATOR TO REACH THE TOP OF SAME

TECHNICAL DOMAIN

The invention relates to an aircraft propulsion assembly comprising an engine with an engine pod of the type equipped with a travelling grate thrust reverser, known particularly through patent FR2981989.

STATE OF PRIOR ART

In such a propulsion assembly, the engine pod surrounding the engine comprises distinct forward fairing and aft fairing that are mobile in translation relative to the engine along the longitudinal direction of the engine.

The forward fairing can be moved between a service configuration and a maintenance configuration in which it is displaced forwards so that an operator can access some parts of the engine from the side.

The aft fairing can move in a controlled manner between a service configuration in which it lies along the prolongation of the forward fairing, and a thrust inversion configuration in which it is shifted in the aft direction to be at a distance from this forward fairing.

In the thrust inversion configuration, the space separating the forward fairing from the aft fairing is occupied by grates that guide part of the air flow propelled by the engine to deviate it forwards, so as to reverse the total thrust that the engine generates.

In a travelling grates thrust reverser architecture, the grates are supported by the aft fairing while remaining along the prolongation of the forward edge of this aft fairing. In a service configuration, the aft fairing extends along the prolongation of the forward fairing, the grates then being covered by the forward fairing. In the thrust inversion configuration, displacement of the aft fairing in the aft direction exposes the grates that are then located in the space separating the forward fairing from the aft fairing so that the air flow passes through them and is deviated in the forward direction.

In general, the travelling grates thrust reverser configuration contributes to reducing the thickness of the pod around most of its circumference, and consequently also the engine drag. Under these conditions, some equipment may not fit inside the reduced thickness of the engine pod and is placed at the pylon by which the engine is suspended from the aircraft wing to take advantage of the fact that the available thickness at the pylon is more than the nominal thickness of the pod.

Consequently, access to the top region of the pod is necessary to be able to work on the equipment positioned at this location. As illustrated on FIG. 1, considering the large dimensions of such an engine denoted 1, access to the top part 2 of the pod requires the use of a dedicated staircase called access steps, denoted 3, in particular with an upper platform and handrails matching the circular periphery of the engine 1.

The operator, denoted 4 in FIG. 1, must then firstly put the access steps 3 into position in contact with the propulsion unit and block its wheels to immobilise it. He can then climb on the ramp 3, to access the upper part of the propulsion assembly, to work on equipment installed at this location.

The purpose of the invention is to provide a solution to facilitate access to equipment located in the upper part of the propulsion assembly for a maintenance operator working on the ground, without disassembling the propulsion assembly.

PRESENTATION OF THE INVENTION

The invention relates to an aircraft propulsion assembly fitted with a travelling grate thrust reverser, comprising:
an engine pod supported by an engine extending along a longitudinal direction with forward fairing and aft fairing covering the engine in the service configuration;
the aft fairing being moveable longitudinally between the service configuration and a thrust inversion configuration in which it is shifted in the aft direction;
the travelling grates being rigidly supported by the aft fairing extending along the prolongation of a forward circular edge of this aft fairing;
the travelling grates being covered by the forward fairing in the service configuration, and extending between the forward fairing and the aft fairing in the thrust reversal configuration;
two fixed curved frames surrounding the engine and separated from each other by a distance;
the forward fairing being moveable longitudinally between the service configuration and a maintenance configuration in which it is shifted in the forward direction;
a space between the two circular frames being at least partially covered when the aft fairing is in the thrust reversal configuration and when the forward fairing is in the maintenance configuration;

This propulsion assembly being characterised in that it comprises a series of elements forming steps installed between the two curved frames, to form a ladder that an operator can use to climb on the engine to access the top of the engine during the maintenance phase.

The invention thus provides a permanent staircase that can eliminate all or some access steps on the ground, while providing access to equipment regardless of the conditions.

The invention also relates to an assembly thus defined, in which the curved frames supporting the steps are rails that also support guide rails and aft fairing displacement actuators.

The invention also relates to an assembly thus defined, in which the steps are formed at the aft fairing displacement guide rails.

The invention also relates to an assembly thus defined in which each step comprises a plate supported by the curved frames while being capable of pivoting about an axis parallel to the longitudinal direction of the engine, between a retracted position in contact with the engine and an extended position in which this plate extends horizontally, and a plate support prop in the extended position.

The invention also relates to an assembly thus defined, in which each prop comprises one end hinged onto the plate by a pivot link, and another end hinged on one side of the engine by another pivot link, and in which each plate can slide in the curved frames along the side of the engine in addition to its ability to pivot, so that it can be moved from its extended position to its retracted position.

The invention also relates to an assembly thus defined, in which each prop comprises one end hinged onto the plate by a pivot link, and another end hinged onto a rotating rail by another pivot link, the rotating rail being moveable along the side of the engine between a high position in which the steps are extended and a low position in which the steps are extended.

The invention also relates to an assembly thus defined, in which each prop is hinged onto the rotating rail and is fixed to this rail by means of an oblong hole allowing displacement of the prop along the rail following a path with a predetermined length.

The invention also relates to an assembly thus defined in which each step comprises a plate supported by the curved frames while being capable of pivoting about an axis parallel to the longitudinal direction of the engine, between a retracted position in contact with the engine and an extended position in which this plate is extended horizontally, and comprising a rotating rail with an upper end installed free to pivot in the upper part of the propulsion assembly, each plate having a free edge fixed to the rotating rail.

DETAILED PRESENTATION OF PARTICULAR EMBODIMENTS

The invention is based on the observation according to which, when the aft fairing in a propulsion assembly with a travelling grate thrust reverser is displaced in the aft direction, and the forward fairing is displaced in the forward direction, the space separating these two fairings can be used to hold steps.

The space left between the forward fairing and the aft fairing is typically located between two curved frames separated from each other along the longitudinal direction, and that support the guide rails and aft fairing displacement actuators that are typically jacks. These curved rails that are curved around the arc of a circle can extend over all or part of the circumference of the engine.

These curved frames can thus form supports for steps, due to the fact that they can support the ends of these steps, and that the space that they delimit is at least partially exposed when the forward fairing and the aft fairing are displaced in the forward and the aft directions respectively. These steps can be composed directly of the aft fairing displacement guide rails, these rails then having appropriate shapes so that they can also form steps.

Alternatively, the additional curved frames can be designed specifically to support the steps, remaining independent of the elements supporting the actuators and the guide rails of the aft fairing.

Figure 1:
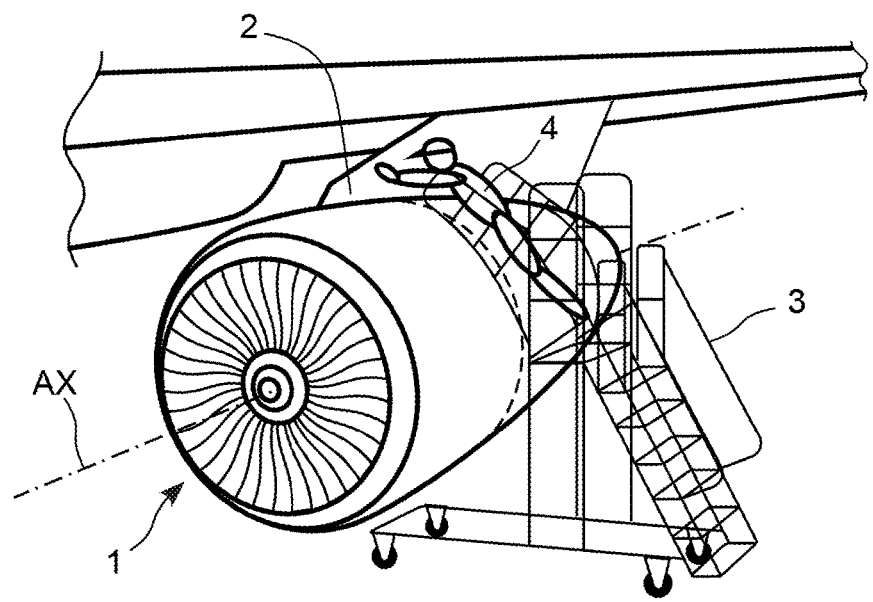
FIG. 1 described above is an overview showing an operator using a special-purpose mobile staircase to access the upper part of an aircraft propulsion assembly.
Figure 2:
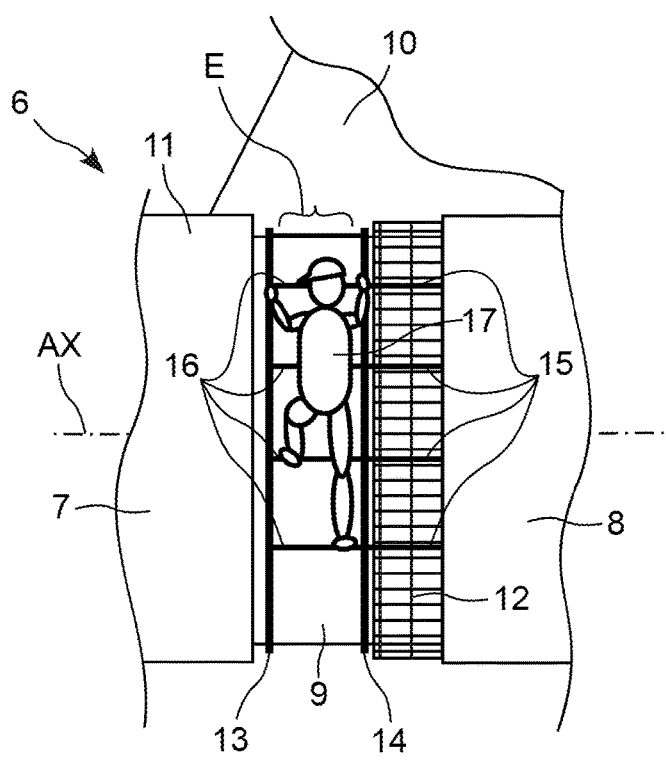
FIG. 2 is a lateral view showing a propulsion assembly according to the invention when its front fairing and its back fairing are displaced in the forward and the aft directions respectively, with an operator climbing on the steps to access its upper part.

The propulsion assembly according to the invention that is shown on FIG. 2 and that is generally denoted on this figure as 6 comprises an engine pod including a forward fairing 7 and an aft fairing 8, this engine pod is supported by a turbojet or similar type engine 9. This pod is fixed to a foot 10 prolonging its upper portion 11 and through which it is fixed to the wing, this foot or pylon providing the main support for the engine.

The aft fairing 8 supports the mobile thrust inversion grates rigidly fixed to it, and that effectively prolong the forward circular edge of this fairing 8.

As can be seen in FIG. 2, when the aft fairing 8 is displaced in the aft direction and the forward fairing 7 is displaced in the forward direction in the maintenance configuration, the longitudinal interval that remains free between these two fairings can be used to at least partially access a space E located between two curved frames 13 and 14.

Figure 2A:
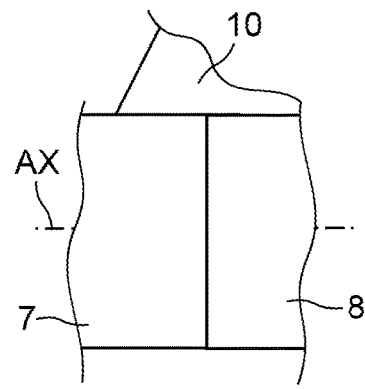
FIG. 2A is a lateral view showing a propulsion assembly according to the invention when its front fairing and its back fairing cover the engine in the service configuration.
Figure 2B:
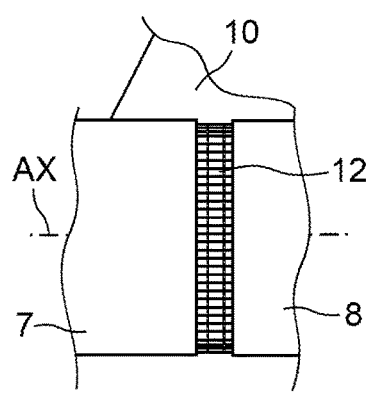
FIG. 2B is a lateral view showing a propulsion assembly according to the invention when its back fairing is displaced in the aft direction in the thrust inversion configuration.

These two curved frames 13 and 14 that support rails and displacement control actuators 15 controlling displacement of the aft fairing 8 between its service position, as shown in FIG. 2A, and its thrust inversion position in which it is displaced in the aft direction, as shown on FIG. 2B, form supports that are capable of supporting the steps 16, as shown in FIG. 2.

These steps 16 extend in the horizontal direction, parallel to each other while remaining accessible when the forward and aft fairings are separate from each other. Specifically, due to the structure of the travelling grates of the propulsion unit, there is a space E between the curved frames, that is exposed and accessible when the fairings are separated from each other.

Figure 3:
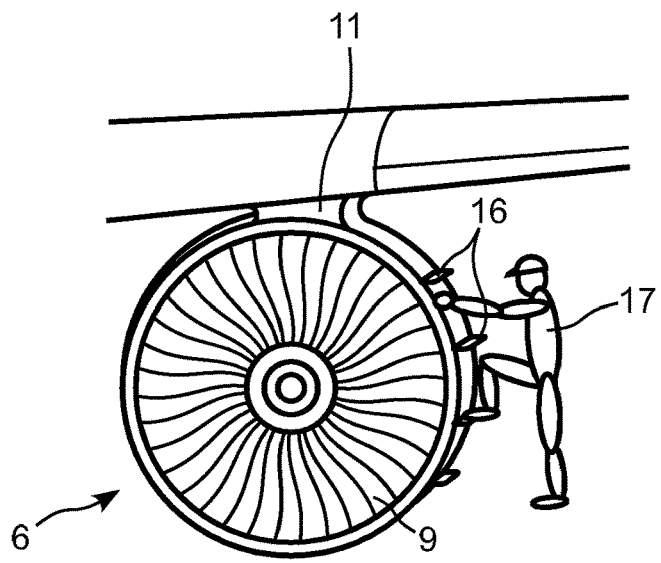
FIG. 3 is a front view showing an operator climbing on the steps of the propulsion assembly according to the invention to access its upper region.

As can be seen on FIG. 3, these steps 16 extend approximately to the cylindrical external face of the engine 9, so that an operator 17 can climb vertically along the side of the engine without any risk of falling, to reach the upper part 11 of the propulsion assembly to be able to work on it.

These steps 16 can be fixed elements that can for example be formed directly at the guide rails 15 of the aft fairing during its controlled displacement. The invention can thus provide an additional function for the rails supported on the frames and that guide the aft fairing in displacement, by adapting these rails so that they also form steps providing a fast access ladder to the upper part of the propulsion unit.

But the steps can also be additional retractable elements, as in the embodiments illustrated in FIG. 3 and the following figures.

Figure 4:
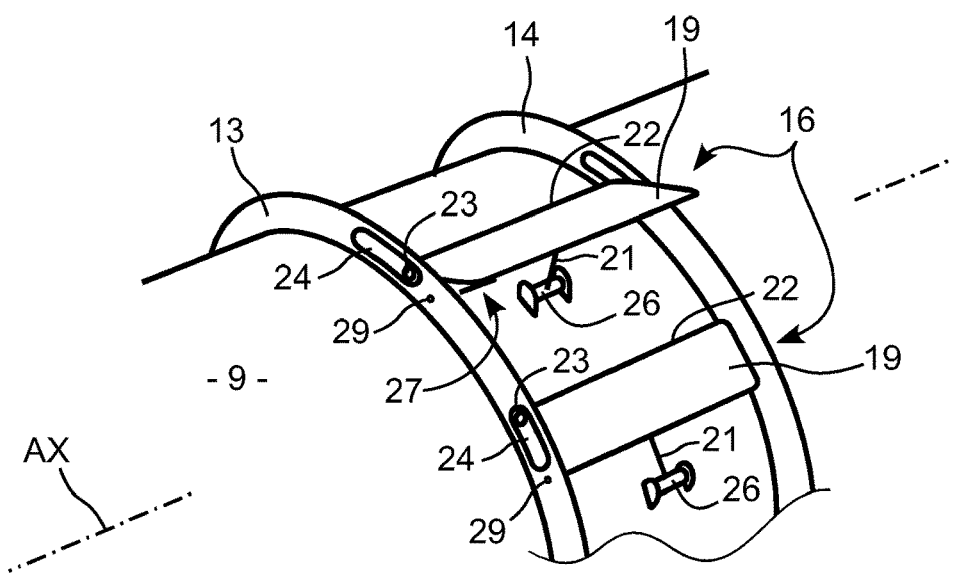
FIG. 4 is a partial perspective view of steps on a propulsion assembly according to a second embodiment of the invention.
Figure 5:
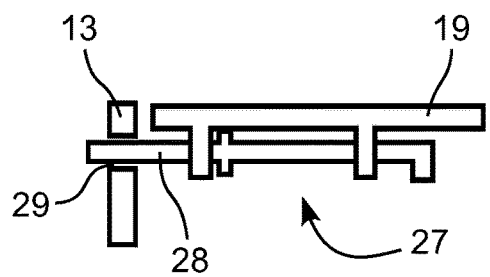
FIG. 5 is a detailed view of a locking element of steps on a propulsion assembly according to a second embodiment of the invention.

In the first embodiment shown in FIGS. 4 and 5, each step 16 comprises a generally rectangular plate 19 extending parallel to the longitudinal axis AX of the engine and a central lower prop 21.

Each plate 19 comprises an upper edge 22 prolonged at each of its ends by a lateral pin engaged in an oblong hole in a corresponding curved frame. FIG. 4 shows the lateral pin for each of the two steps 16 represented in the figure, located on the forward side of the engine and denoted 23, and the corresponding oblong hole denoted 24 formed in the curved frame 13 and in which this lateral pin 23 is engaged.

Each plate 19 is thus supported by curved frames 13 and 14, while remaining free to pivot about its upper edge 22 and to be displaced along the curved frames 13 and 14 while remaining parallel to itself, along a path corresponding to the length of the oblong holes 24.

Each prop 21 comprises a first end fixed to a hinge 26 supported by the external face of the engine 9, to pivot about a horizontal axis, and a second end hinged to the lower face of the corresponding plate 19 to pivot about another longitudinal axis.

Each step 16 is thus free to move between an extended position and a retracted position.

In the extended position, that is the position shown in the top part of FIG. 4, the plate 19 extends horizontally with its edge 22 in the low position that runs along the external face of the engine, the lateral pads then each being in the lower end of the oblong holes into which they fit. The prop 21 then forms an angle with the plate 19 that it thus supports in its horizontal position.

In the retracted position that corresponds to the lower position on FIG. 4, the plate 19 is retracted in contact with the external face of the engine while having its upper edge 22 in the high position, the lateral pads of the plate 19 each being in the upper end of the oblong holes into which they fit. The prop 21 then extends approximately parallel to the plane of the plate 19.

The plate 19 of each step 16 advantageously has a lateral latch 27 on its lower face, that locks the step on which it is fitted in the retracted position.

This lateral latch 27 comprises a bolt 28 extending along the edge opposite the edge 22, on the same side as the pad 23, so that it projects parallel to the pad 23 from the lateral edge of the plate 19.

This bolt 28 can thus occupy a retracted position as in FIG. 4 to release the step 16 so that it can leave its retracted position, or an extended position as in FIG. 5 so that it can be engaged in a corresponding hole 29 to hold the plate 29 in the retracted position.

As can be seen on FIG. 4, the hole 29 is formed in the curved frame 13 at a distance from the oblong hole 24 such that the bolt 28 can only be engaged in this hole 29 when the plate 19 is retracted in contact with the side of the engine.

The operator who needs to work near the top part of the propulsion assembly firstly puts the aft fairing in the thrust inversion configuration and the forward fairing in the maintenance configuration, so as to provide access to the intermediate space E so that the steps can be used.

He then unlocks the latch of the lowest step and pivots its plate to put it into the horizontal position, which then naturally locks into place with its pads at the lower end of the oblong holes with its support prop holding it in place.

The operator then repeats the same operation for the other steps that are accessible to him, in other words low enough for him to reach with his hand. He can then start to climb up the side of the engine in complete safety, while unlocking the next steps and extending them as he climbs and as they become accessible to him.

Conversely, when the operator has finished working on the upper part of the propulsion assembly, he goes down again using the steps 16, and he folds back the steps that he has used one after the other as he goes down, using their latches to lock them in the retracted position.

Figure 6:
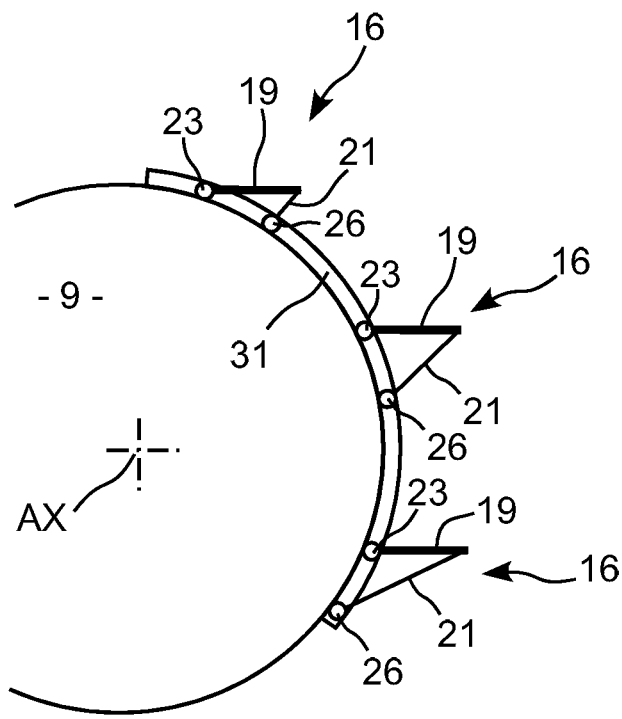
FIG. 6 is a partial front view showing steps of a propulsion assembly according to a first embodiment of the invention in the extended position.
Figure 7:
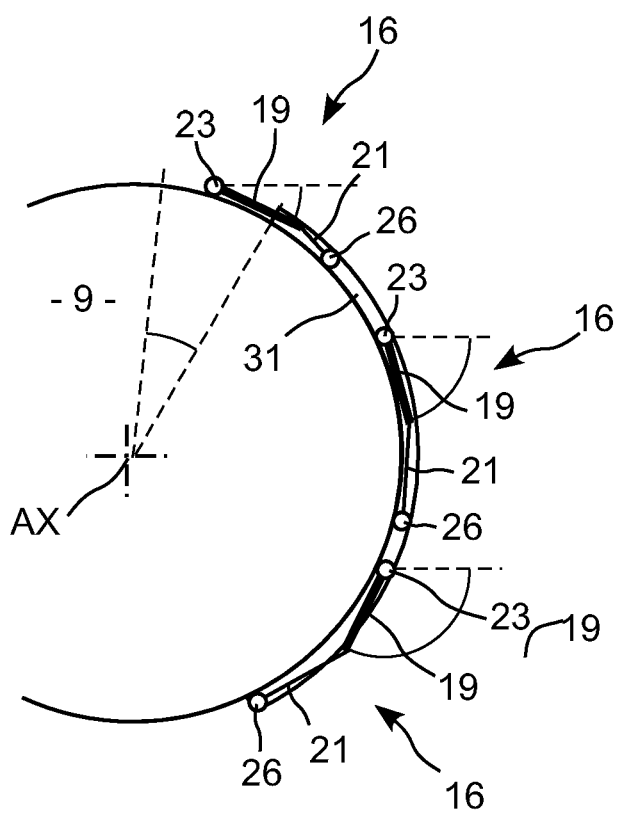
FIG. 7 is a partial front view showing steps of a propulsion assembly according to the first embodiment of the invention in the retracted position.

In the second embodiment illustrated on FIGS. 6 and 7, the plates 19 of the steps 16 can only pivot about their top edge 22 without any possibility of translation, and it is the hinges 26 at the first ends of the props 21 that can translate along the side of the engine.

In this second embodiment, the lateral pads 23 of each plate 19 are engaged in corresponding simple holes in the curved frames, and not in oblong holes. Complementarily, each hinge 26 is supported on a mobile device forming a rotating rail identified as 31, that can slide along the side of the engine 9 in a rotation movement about the longitudinal axis AX of this engine.

Starting from the situation in which all steps are extended as shown in FIG. 6, the complete set of steps is retracted simply by lowering the rotating rail 31 in a pivot movement about the AX axis, which leads to the situation shown in FIG. 7.

When the steps 16 are retracted as shown in FIG. 7, they can be extended by lifting the rotating rail 31 along the edge of the engine 9, and then locking it in position using a locking system, not shown.

As can be seen on FIG. 6, the lengths of the props 21 are different for each step, depending on whether the step considered is in the upper part of the lower part on the engine, with the upper steps having the shortest props.

Under these conditions, the path length of the rotating rail 31 corresponds to the path length of the longest prop, namely the path length of the hinge 26 of the lowest step, to move from the retracted position to the extended position. Since the path lengths of the hinges 26 of the props of the other steps are shorter, each of these hinges 26 has freedom to move relative to the rail 31 that supports it in that they are mounted for example in an oblong hole in this rail so that they are free to slide along this oblong hole.

Thus, for the highest step on the figures, the length of the oblong hole supporting the corresponding hinge 26 in the rail 31 corresponds to the difference between the path length of the hinge 26 of the lowest step and the path length of the hinge 26 of the highest step.

Figure 8:
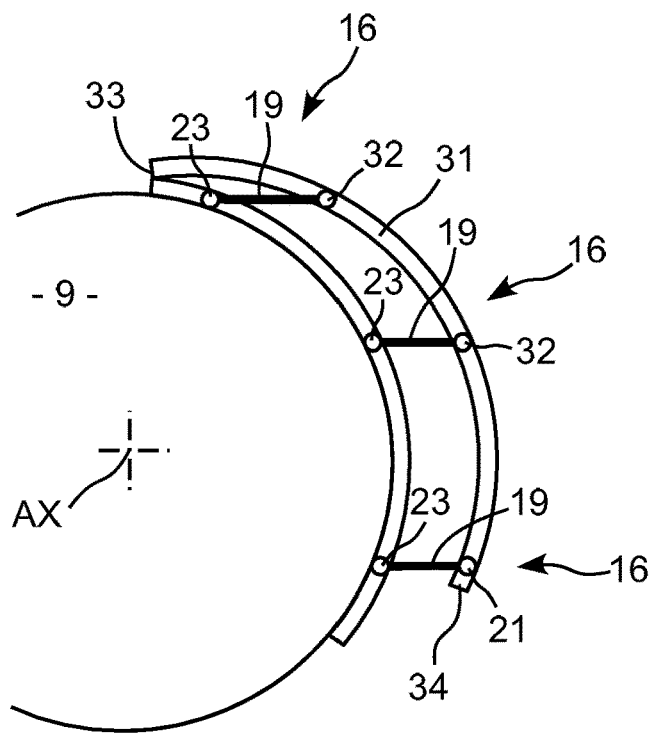
FIG. 8 is a partial front view showing steps on a propulsion assembly according to a third embodiment of the invention in the extended position.
Figure 9:
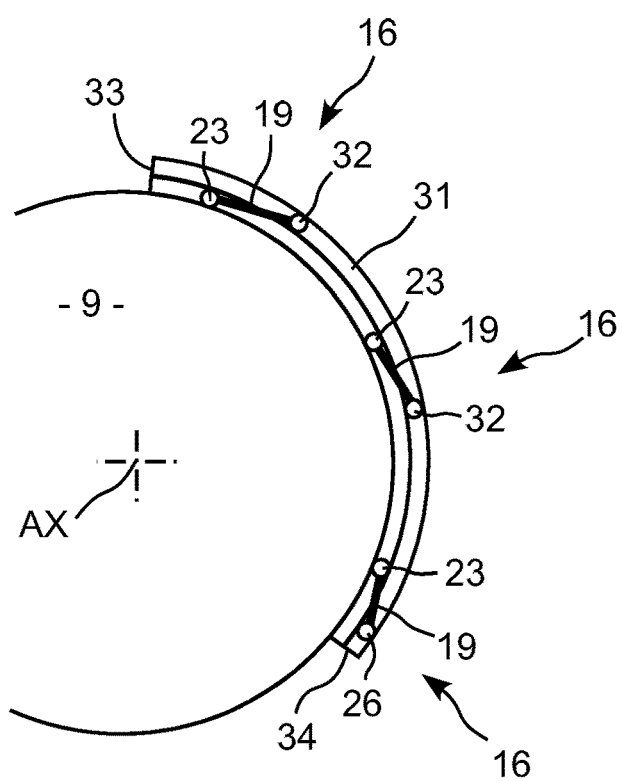
FIG. 9 is a partial front view showing steps on a propulsion assembly according to the third embodiment of the invention in the retracted position.

In a third embodiment corresponding to FIGS. 8 and 9, the plates of the steps are only capable of pivoting about their upper edge, as in the second embodiment, but the free edges of these plates are fixed directly to a rotating rail 31, without having any props.

In this other embodiment, the rotating rail 31 is hinged on the side of the engine 9 at the upper end 33 of this rail 31 that is located above the highest step 16. The lower end 34 of this rail 31 is thus free to move between a position separated from the side of the engine 9, to extend the steps, and a retracted position in contact with the side of the engine 9, to retract the steps 16.

In this third embodiment, each plate 19 is fixed to the curved frames 13 and 14 by lateral pads 23, as in the second embodiment. But in this case the free edge of each plate 19 is fixed to the rotating rail 31 while being capable of pivoting relative to this rail, and also to translate along a short distance, for example by means of an oblong hole provided in this rotating rail.

In the example in FIGS. 8 and 9, the system comprises a single rotating rail, but it may advantageously be designed with two rotating rails located on each side of the plates to make it more ergonomic for the operator.

In this third embodiment, the operator who would like to extend the steps must grip only the lower end of the rotating rail to move it away from the engine to bring it into the situation in FIG. 8 in which the steps are extended, and to fix it in position using locking means not shown.

In order to retract the steps, the operator simply unlocks the locking means to retract the rotating rail into contact with the side of the engine 9, so that all the steps can be retracted together.

In the examples that have been described, the steps are extended manually by the operator, but it is also possible to have a system for example assisted by jacks, capable of extending and retracting the steps on order.

Furthermore, in the examples that have been described, the steps are supported by curved frames following arcs of circles that support the actuators and aft fairing guide rails, but it would also be possible to provide curved rails specifically designed to support the steps.

The invention claimed is:

1. An aircraft propulsion assembly fitted with a travelling grate thrust reverser, comprising:
    an engine pod supported by an engine extending along a longitudinal direction with a forward fairing and an aft fairing covering the engine in a service configuration;
    the aft fairing being moveable longitudinally between the service configuration and a thrust inversion configuration wherein the aft fairing is shifted in an aft direction;
    travelling grates being rigidly supported by the aft fairing extending along a prolongation of a forward circular edge of said aft fairing;
    the travelling grates being covered by the forward fairing in the service configuration, and extending between the forward fairing and the aft fairing in the thrust inversion configuration;
    two fixed curved frames surrounding the engine and separated from each other by a distance;
    the forward fairing being moveable longitudinally between the service configuration and a maintenance configuration wherein the forward fairing is shifted in the forward direction;
    a space between the two curved frames being at least partially covered when the aft fairing is in the thrust inversion configuration and when the forward fairing is in the maintenance configuration;
    said propulsion assembly comprising a series of elements forming steps installed between the two curved frames, to form a ladder.

2. The aircraft propulsion assembly according to claim 1, wherein the curved frames supporting the steps are curved rails that also support guide rails and displacement actuators for the aft fairing.

3. The aircraft propulsion assembly according to claim 2, wherein the steps are formed at the guide rails for the aft fairing.

4. The aircraft propulsion assembly according to claim 1, wherein each step comprises a plate supported by the curved frames while being capable of pivoting about an axis parallel to the longitudinal direction of the engine, between a retracted position in contact with the engine and an extended position wherein said plate extends horizontally, and a prop holding the plate support in the extended position.

5. The aircraft propulsion assembly according to claim 4, wherein each prop comprises a first end hinged onto the plate by a first pivot link, and a second end hinged on one side of the engine by a second pivot link, and wherein each plate can slide in the curved frames along the side of the engine so that each plate can be moved from the extended position to the retracted position.

6. The aircraft propulsion assembly according to claim 4, wherein each prop comprises a first end hinged onto the plate by a first pivot link, and a second end hinged onto a rotating rail by a second pivot link, the rotating rail being moveable along the side of the engine between a high position wherein the steps are extended and a low position wherein the steps are extended.

7. The aircraft propulsion assembly according to claim 6, wherein each prop is hinged onto the rotating rail and is fixed to said rotating rail with an oblong hole allowing displacement of the prop along the rotating rail following a path with a predetermined length.

8. The aircraft propulsion assembly according to claim 1, wherein each step comprises a plate supported by the curved frames while being capable of pivoting about an axis parallel to the longitudinal direction of the engine, between a retracted position in contact with the engine and an extended position wherein said plate is extended horizontally, and comprising a rotating rail with an upper end installed free to pivot in the upper part of the propulsion assembly, each plate having a free edge fixed to the rotating rail.

9. The aircraft propulsion assembly according to claim 1, wherein each step is extends parallel to the longitudinal direction.

* * * * *